US008130689B2

(12) United States Patent
Zhou

(10) Patent No.: US 8,130,689 B2
(45) Date of Patent: Mar. 6, 2012

(54) METHOD AND DEVICE FOR THE DYNAMIC SETTING UP AND CONTROL OF TEMPORARILY FORMED COMMUNICATIONS GROUPS WITH SECURE TRANSMISSION

(75) Inventor: Di Zhou, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 479 days.

(21) Appl. No.: 12/302,048

(22) PCT Filed: May 9, 2007

(86) PCT No.: PCT/EP2007/054505
§ 371 (c)(1),
(2), (4) Date: Dec. 31, 2008

(87) PCT Pub. No.: WO2007/134970
PCT Pub. Date: Nov. 29, 2007

(65) Prior Publication Data
US 2009/0290522 A1 Nov. 26, 2009

(30) Foreign Application Priority Data

May 23, 2006 (EP) ................... 06114404

(51) Int. Cl.
H04H 20/71 (2008.01)
(52) U.S. Cl. ......... 370/312; 370/432; 709/244; 709/245
(58) Field of Classification Search .......... 370/312, 370/408, 432; 709/244, 245
See application file for complete search history.

(56) References Cited

U.S. PATENT DOCUMENTS

| 6,529,882 | B1* | 3/2003 | Park et al. ............... 705/51 |
| 7,710,961 | B2* | 5/2010 | Miller et al. ............ 370/390 |
| 2003/0145102 | A1 | 7/2003 | Keller-Tuberg |
| 2005/0198126 | A1* | 9/2005 | Verbestel ............... 709/204 |
| 2006/0268873 | A1* | 11/2006 | Tonjes et al. .......... 370/392 |
| 2008/0025239 | A1* | 1/2008 | Bossoli et al. ......... 370/312 |

FOREIGN PATENT DOCUMENTS

| EP | 0952718 | A2 | 10/1999 |
| EP | 1331755 | A2 | 7/2003 |
| EP | 1562322 | A1 | 8/2005 |

OTHER PUBLICATIONS

Wang et al, "An Efficient Method of group Rekeying for Multicast Communication", EmergingTechnologies: Frontiers of Mobile and Wireless Communication, 2004, Proceedings of the IEEE 6th Circuits and Systems Symposium on Shanghai, China, May 31-Jun. 2, 2004, pp. 273-276, XP010716071.

(Continued)

Primary Examiner — Luat Phung
(74) Attorney, Agent, or Firm — Laurence A. Greenberg; Werner H. Stemer; Ralph E Locher

(57) ABSTRACT

A method and a device are provided for the dynamic setting up and control of temporarily formed communications groups with secure transmission, in which nodes potentially participating in a communications group are connected via a common transmission medium. The transmission medium enables an efficient transmission of so-called broad- and/or multicast-messages.

13 Claims, 4 Drawing Sheets

OTHER PUBLICATIONS

3RD Generation Partnership Project (3GPP), "3GPP TS 22.146 V7.1.0, 3rd Generation Partnership Project; Technical Specification Group Services and System Aspects; Multimedia Broadcast/Multicast Service; Stage 1 (Release 7)", Mar. 2006, XP002385907.

3GPP Group Services and System Aspects, "3GPP TS 23. 246 V. 6.5.0: Multimedia Broadcast/Multicast Service (MBMS); Architecture and functional description Release 6", Dec. 2004, XP002333585.

* cited by examiner

METHOD AND DEVICE FOR THE DYNAMIC SETTING UP AND CONTROL OF TEMPORARILY FORMED COMMUNICATIONS GROUPS WITH SECURE TRANSMISSION

BACKGROUND OF THE INVENTION

Field of the Invention

The invention relates to a method and a device for the dynamic setting up and control of temporarily formed communications groups with secure transmission, wherein nodes potentially participating in a communications group are connected via a common transmission medium. This transmission medium then provides for an efficient transmission of so-called broadcast and/or multicast messages.

At present, more and more different types of mobile and wire-connected communications networks are designed, developed and used in the telecommunications field. In this context, a communications network, according to its definition, is understood to be a covering term for all resources which provide users with services having service features for communication purposes or for transmitting data, respectively.

To be able to provide these services to the user independently of their current location, a collaboration between communications networks such as, e.g. personal area networks (PAN) which, for example, can be set up and cleared ad-hoc by means of wire-connected transmission technologies (e.g. USB, FireWire, etc.), for example by devices such as PDAs or mobile telephones, or also by means of wireless technologies (e.g. IrDA, Bluetooth etc.), body area networks (BAN), sensor area networks (SAN), etc. is necessary. In this context, it must be possible to set up this collaboration as rapidly and dynamically as possible—particularly in a very mobile environment. To provide for this, but also, e.g. for a common utilization of resources or services, various mobile or wire-connected communications networks or also individual devices such as, e.g. PDAs, mobile telephones, laptops etc can form so-called communications groups for various purposes—such as, for example: if a local communications group is set up in a train by a group of passengers by means of their PANs in order to jointly play an electronic game; if during a trade exhibition, experts with various sites on the exhibition grounds, form a communications group for discussion purposes with their electronic equipment (e.g. laptop, PDA etc); if employees of a company, for example from different areas, form a dynamic communications group with their electronic equipment (e.g. laptop, PDA etc) in order to observe and to discuss a random event (e.g. sequence reactions triggered by a software program etc.) or if some passengers in a departure hall of an international airport form a communications group in order to exchange information about flight destinations etc.

All these exemplary scenarios have some characteristics in common:
the nodes participating in a communications group do not necessarily need to know each other before setting up this communications group (e.g. identifiers, electronic addresses, security keys etc. are not known beforehand), in order, e.g., to then exchange information within the communications group formed. In this context, the term "node" designates both a terminal used by a user such as, e.g. PDA, laptop, mobile telephone, computer etc. and a communications network such as, e.g. PAN, BAN, SAN etc. which comprises several devices (e.g. laptop, PDA, mobile telephone etc.).

A node or the equipment used for the communication only has a limited coverage range. In addition, the nodes are connected via a common transmission medium, such as, e.g. by an Ethernet link or within an area supplied by an access point to a wireless LAN.

It is not possible to assume the existence of general infrastructure services as are provided, for example, by the Internet.

The communications group is set up dynamically when required and exists for a relatively short time.

Communication within the communications group is carried out in accordance with the peer-to-peer principle and the transmission should be secure—i.e. it should not be possible that a node not participating in the communications group is able to monitor the communication taking place within the communications group.

The communications group should be set up and controlled dynamically and automatically since the participating users in most cases can be assumed to have no experience or only slight experience in the field of network management.

It is also necessary that the transmission medium to which the nodes are linked provides an efficient mechanism for the transmission of so-called broadcast and multicast messages since, on the one hand, it cannot be predicted what number of nodes will participate in a communications group. On the other hand, communication within the communications group can also take place from one node to all other nodes of the communications group—for example when a node starts a communications group in order to invite other nodes to a video information with discussion.

Broadcast designates the transmission of an electronic message or copies of this message with identical content from a transmitting node to all nodes of a communications network or several collaborating communications networks. A so-called broadcast message is then predominantly used in communications networks if the addresses of the receiving nodes are not yet known. Similarly, broadcast messages are used for a simple transmission of information to all nodes of a communications network or several collaborating communication networks. This message must then be received by each node which receives a broadcast message and must then decide whether the message needs to be processed by it. If the receiving node does not recognize any responsibility for this message, the message is discarded.

Multicast is understood to be the transmission of an electronic message or copies of this message with identical content from a transmitting node to a group of receiving nodes.

If a message is transmitted point-to-point—i.e. from a transmitting node to a receiving node, this message is also-called a unicast message.

The advantage of broadcast or multicast messages consists in that a message can be sent simultaneously to all nodes of a communications network or to several nodes or all nodes of a group. This means that the transmitting node, as a rule, only needs a bandwidth which is identical with that when transmitting the electronic message to a single receiver. In the case of broadcast or multicast messages, therefore, it is not necessary that the required bandwidth is scaled with the number of receiving nodes, particularly if the messages are transmitted via a common transmission medium.

The question is generally how, if necessary, communications groups forming temporarily can be set up and controlled with secure transmission dynamically in the most efficient manner starting from a node, a so-called initiator node.

In the prior art, automatic and dynamic setting up and control of temporarily formed communications groups and a secure transmission of multicast messages within the communications groups are not supported. At present, communications groups are set up statically, i.e. before setting up the communications group, a corresponding registration of the nodes is necessary in order to be able to exchange information, e.g. in the form of multicast messages. This registration (e.g. notification of identifier and address of the node) must be carried out in most cases by the user before participating in the communications group, wherein specific technical know-how is not infrequently assumed.

As a rule, existing methods for transmitting broadcast or multicast messages such as, e.g., the method known from the document "3GPP TS 22.146 V7.1.0 (2006-03); 3rd Generation Partnership Project; Technical Specification Group Service and System Aspects; Multimedia Broadcast/Multicast; Stage 1 (Release 7)" are based on the fact that a so-called multicast identifier, which is also called a multicast address, is defined and assigned to a group of nodes. In this context, it is necessary that all transmitting and receiving nodes have the information about the multicast identifier. For this reason, a registration of all nodes participating in a communications group is required before this communications group is started so that multicast messages can be transmitted within the group.

Corresponding methods are thus essentially only suitable for static applications such as, for example, television or radio transmissions which also presuppose a medium- to long-term membership of the nodes in the communications group. In such applications, it is normally not necessary for a transmitting node to have information about characteristics of the receiving nodes. Furthermore, from the point of view of a transmitting node, it is also not necessary to ensure in these applications that all receiving nodes can actually receive a transmitted multicast message and that the transmission of this message is carried out in secure form.

For the above reasons, the methods described above are unsuitable in their applicability to the automatic and dynamic setting up and control of temporarily formed communications groups within which the transmission of messages should take place in secure form and these messages should also be received reliably by the participating nodes. Due to the necessity of prior registration which also assumes the existence of general infrastructure services and possibly specific technical know-how, it is not possible to spontaneously form a communications group in a simple manner and for a short time, if necessary.

BRIEF SUMMARY OF THE INVENTION

The present invention is therefore based on the object of specifying an efficient method and a device by means of which, if required, communications groups with secure transmission are temporarily set up automatically and dynamically in an efficient and simple manner.

The object is achieved by a method of the type initially specified, wherein the dynamic setting up of a communications group is carried out by an initiator node in the following steps:

sending of a broadcast message which contains at least one group identifier, an identifier of the initiator node, information about the communications group and an address of the initiator node to all nodes connected to the initiator node via the common transmission medium, analyzing the received broadcast message by the nodes accessible via the common transmission medium, wherein the initiator node is authenticated by said nodes, sending back a unicast message by nodes participating in the communications group to the initiator node, wherein the unicast message contains at least one identifier and an address of the participating node, receiving these unicast messages and authentication of the participating nodes by the initiator node, sending of a unicast message which comprises at least one multicast identifier and a security key, to each node participating in the communications group by the initiator node.

The main aspect of the solution proposed according to the invention consists in that the communications group is set up dynamically and automatically. It is not assumed that nodes which participate in the communications group must be informed about group-specific information such as, e.g. multicast identifier or security keys before the setting up and start of the communications group as a result of which the user does not need to perform any elaborate registration which not infrequently assumes specific know-how. In addition, multicast messages can be sent out in a simple manner and in secure form within the communications group due to the common multicast identifier and the common security key.

It is advantageous, for a synchronized start of the communications group, if the initiator node sends a special encrypted multicast message to all nodes participating in the communications group. In certain applications such as, for example, transmission of video information or discussion groups with a fixed time frame, all group members can thus be informed in a simple manner about the start of the communications group.

It is advantageous if the initiator node sends the identifiers of all nodes participating in the communications group to all nodes participating in the communications group so that participating nodes also send unicast messages selectively and in a simple manner to other participating nodes.

It is also recommended if, for a continuous expansion of an existing communications group, the initiator node sends at periodic intervals a broadcast message which contains at least one group identifier, an identifier of the initiator node, information about the communications group and an address of the initiator node, via the common transmission medium, then in order to join the existing communications group, nodes send a unicast message which contains at least one identifier and an address of the participating node to the initiator node and these nodes are then authenticated by the initiator node and a unicast message which comprises at least the multicast identifier and the security key of the communications group is sent to these nodes. In this simple manner, an interested user or node can participate in the communications group at any time without great effort.

An important aspect of the invention also consists in that a node which is leaving the communications group sends a special unicast message, which comprises at least its identifier, to the initiator node that the initiator node, after receiving the unicast message then authenticates the corresponding node and deletes the associated information and the initiator node then generates a new security key and sends it encrypted to each node remaining in the communications group by means of a unicast message. On the one hand, as a result of this each participating node can leave the communications group at any time in a simple and efficient manner. On the other hand, generating and distributing a new security key ensures that those nodes which have left the communications group can no longer monitor the communication within the communications group.

It is advantageous if, in the unicast message, together with the new security key information about the node which has left the communications group is sent. This informs the remaining nodes about which node has left the communications group and prevents, for example, messages being sent to this node.

It is also advantageous if, after a node has left the communications group, the multicast identifier and/or the group identifier are also changed in addition to the security key. This ensures that no more multicast messages are sent to the node which has left the communications group and thus the transmission medium from being unnecessarily loaded.

A suitable development of the invention provides that the initiator node which is leaving the communications group sends a special multicast message which comprises at least its identifier and a request for function transfer to all nodes participating in the communications group, that all those nodes which can take over the initiator function send a special unicast message which contains at least their identifier to the initiator node, that after receiving these unicast messages and authenticating the responding nodes, the initiator node selects from these responding nodes a new initiator node in accordance with a predetermined procedure, that information about the communications group and about the participating nodes is then transmitted by the initiator node to the new initiator node by means of a unicast message, and that the new initiator node then takes over the initiator function and generates a new security key which is sent encrypted and together with information about the new initiator node to each node present in the communications group by means of a unicast message.

This procedure ensures in a simple manner that the communications group can be continued and controlled even after the initiator node has left the communications group. In addition, a procedure for choosing the new initiator node can be predetermined—e.g. the first node which receives a corresponding unicast message or which has certain defined characteristics etc. becomes the new initiator node.

It is also advantageous if an asymmetric encryption system is used during the setting up of and/or when leaving the communications group, since this encryption system can be used not only for an encryption but also for an authentication. In addition, when a general security service is present in the communications network or the collaborating communications networks, this security service is used. If this security service is not available, the public key of the initiator node, for example, can be sent with the broadcast message or the public key of the respective participating nodes can be sent with the respective unicast message.

An asymmetric encryption system which is also-called a public key method uses various keys for encrypting and decrypting—so-called public and private keys, the public key being made generally accessible. The basic concept of the asymmetric encryption system consists in that the encryption is carried out with the aid of the public key and a known algorithm which are provided by the receiving node to the transmitting node via, e.g., publically accessible channels or by means of a publically accessible security service. The decryption, e.g. of a message, is then effected by the receiving node with a private key matching the public key, which is only known to the receiving node.

In a reversion of the method, the asymmetric encryption system can also be used for the authentication, i.e. for determining or checking the authenticity of a transmitting node. In this context, a content (e.g. the identifier of the respective transmitting node such as, e.g. of the initiator node, participating node) of a message is encrypted with the private key. The receiving node then checks via the decryption with the public key whether a source of a message matches the assumed transmitting node.

As an alternative, a symmetric encryption system can also be used within the communications group since in the symmetric encryption system, only one key (security key) is used for encrypting and decrypting messages in order to protect the communication against unauthorized access within the communications group. This security key which is used for encryption and decryption by all nodes participating in the communications group is generated by the initiator node, for example during the setting up of the communications group, and then provided, together with the multicast identifier, to the participating nodes. If a node leaves the communications group, it is only necessary to generate and distribute one new security key. In addition, by using a symmetric encryption system, no elaborate general security service needs to be set up for the time of the existence of the temporary communications group.

In a preferred embodiment, the method according to the invention is designed in such a manner that a medium of the data link layer is used as the common transmission medium since in the protocol stacks normally used, for example implemented in accordance with the OSI (open system interconnection) model, the data link layer (layer 2, also-called link layer), as a rule, is implemented in the form of a common transmission medium.

It is also advantageous if a radio transmission channel is used as the common transmission medium since, as a result, the method according to the invention for the dynamic setting up and control of temporarily formed communications groups with secure transmission can also be used in the case of nodes connected to one another wirelessly via a mobile radio network.

The method according to the invention can also be designed preferably in such a manner that a data bus is used as the common transmission medium. In the case of wire-connected nodes connected to one another, a data bus is a commonly used and efficient common transmission medium.

To transmit broadcast, multicast and unicast messages, any existing or future protocol standards of wireless or wire-connected technologies, particularly of the data link layer, can be used which use a common transmission medium. As examples, GSM (Global System for Mobile Communications) WCDMA (Wideband Code Division Multiple Access) TD-SCDMA (Time Division Synchronous Code Division Multiple Access) and WiMAX (Worldwide Interoperability for Microwave Access) shall be mentioned. In a particularly preferred development of the method according to the invention, the broadcast, multicast and unicast messages are sent by using the Ethernet (IEEE802.3) standard or the Wireless Local Area Network (WLAN, IEEE802.11) standard since these two standards are widely used protocol standards of the data link layer in wire-connected or wireless communications networks.

In addition, the object is also achieved by a device or node, respectively, for the dynamic setting up and control of temporary and secure communications groups, at least the following logic components being provided in this node:
- a central management device for interaction with applications, components or users of the node and for controlling and processing messages which are exchanged between the nodes participating in a communications group,
- a device for managing and for storing various procedures with respect to setting up and controlling communications groups, a group information management device for managing and storing all information items about the communications groups in which the node is participating, a device for generating the security keys for secure transmission of messages within the communications group, a message builder for generating broadcast, multicast and unicast messages, a message transmitter for transmitting broadcast, multicast and unicast messages, a message receiver for receiving broadcast, multicast and unicast messages from the transmission medium, and a processing device for analyzing the incoming broadcast, multicast and unicast messages and the information contained therein.

This device comprises at least those logic components which a node must have in order to be able to automatically and dynamically set up and control a communications group in a simple and efficient manner, on the one hand, so that this node, on the other hand, can participate in such a communications group without the effort of registering or without the prerequisite of general infrastructure services.

In the text which follows, the invention will be explained in greater detail in an exemplary manner, referring to the attached figures, in which:

DESCRIPTION OF THE INVENTION

Figure 1:
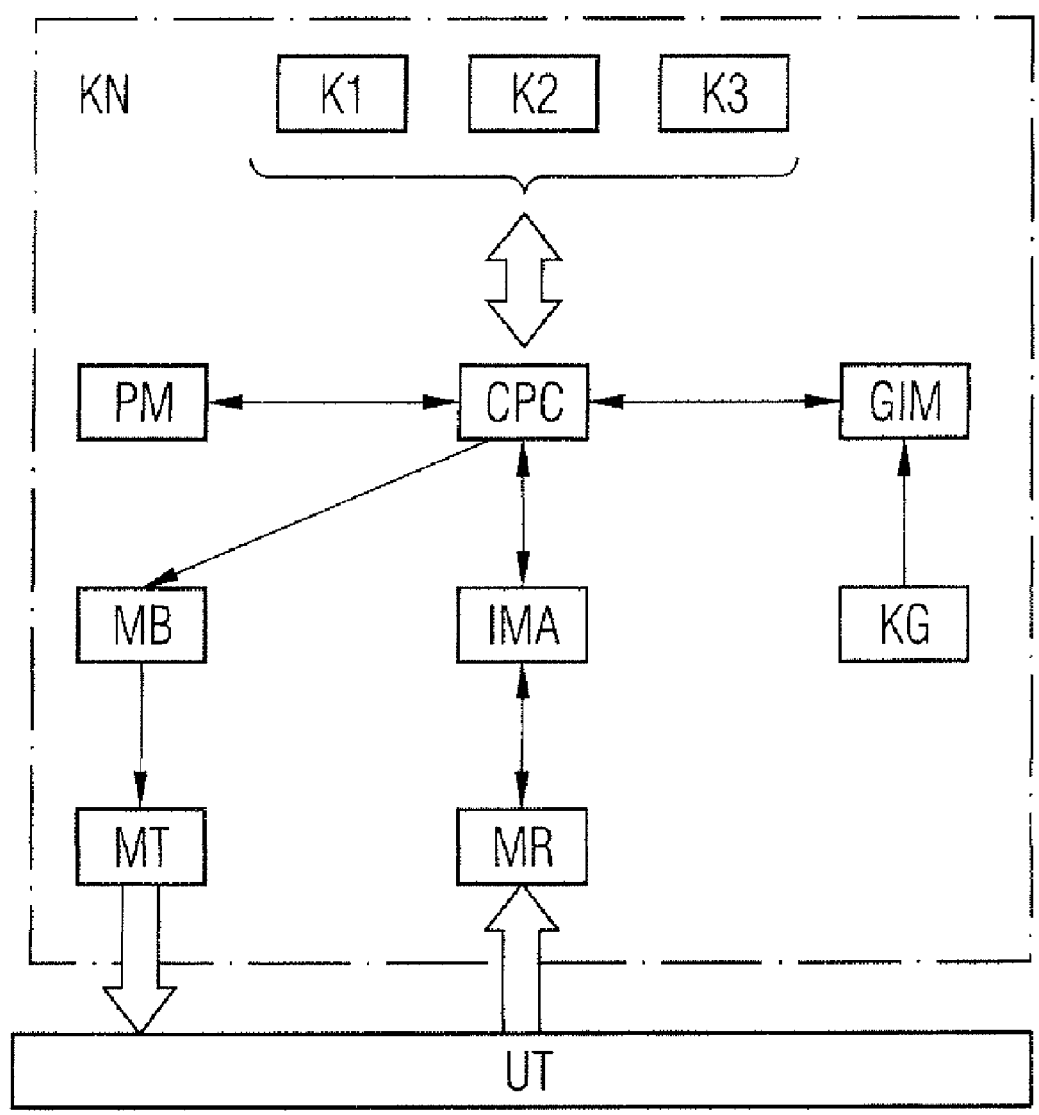
FIG. 1 shows a diagrammatic representation of the logic components of a node for carrying out the method according to the invention.

FIG. 1 shows by way of example a diagrammatic representation of a node KN for carrying out the method according to the invention, wherein both a node which starts a communications group and a node only participating in the communications group should have the basic logic functions shown by way of example.

Apart from other components or applications K1, K2, K3, which are not needed in a sequence of the method according to the invention, the node KN comprises a central management device CPC. The central management device CPC controls, on the one hand, interactions with the other components or applications K1, K2, K3 and users of the node KN. On the other hand, the central management device CPC also controls and processes messages which are exchanged within the communications group and communicates with the logic functions of the node necessary for setting up and controlling a communications group.

Furthermore, the node KN comprises a device for managing and storing various procedures (models) for setting up and managing temporary communications groups—a so-called policy manager PM.

Apart from the policy manager PM, a group information management device GIM is also provided which manages and stores specific information—such as, for example, group identifiers, multicast identifiers, identifiers of participating nodes etc.—of different communications groups. A device for generating security keys—the so-called key generator KG—provides group-specific security keys for the group information management device GIM. These security keys are then used, e.g. for a symmetrical encryption system for the secure transmission of multicast and unicast messages within the communications group. In principle, the key generator KG is only used in a node KN which starts and controls a communications group. However, since each node KN should be capable of initiating or managing a communications group, the key generator KG can also be provided in nodes KN only participating in the communications group.

Furthermore, the node KN comprises a message generating device or a message builder MB which is controlled by the central management device. Using the message builder MB, broadcast, multicast and unicast messages are generated. The message builder MB drives a message transmission device or message transmitter MT which then forwards the broadcast, multicast or unicast messages to a transmission medium UT.

Furthermore, the node KN also comprises a message receiving device, or a message receiver MR which receives broadcast, multicast and unicast messages via the transmission medium UT. The message receiver MR forwards received messages to a processing device for analyzing the incoming messages—a so-called incoming message analyzer IMA. The incoming message analyzer IMA analyzes information contained in the incoming messages (e.g. group identifiers, identifiers and addresses of other nodes KN, profile and/or purpose of a communications group, etc.) and forwards these to the central management device CPC.

Figure 2:
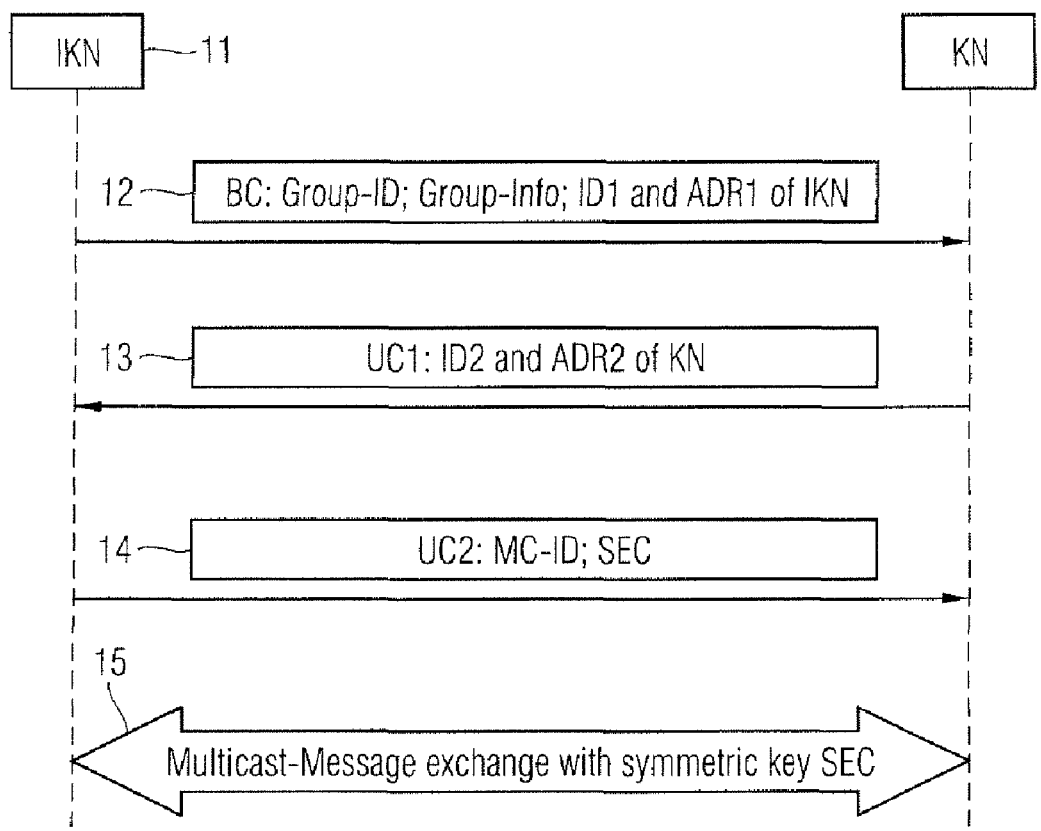
FIG. 2 shows the diagrammatic sequence of the dynamic setting up of a temporarily formed communications group with secure transmission.

FIG. 2 shows the diagrammatic sequence of an automatic and dynamic setting up of a temporarily formed communications group with secure transmission. In this context, a node—a so-called initiator node IKN—attempts to set up a new communications group for a certain purpose—such as, e.g. for a discussion group, for an electronic game with several players, for providing video information etc. For this purpose, the group information management device GIM of the initiator mode IKN generates in a first method step 11—triggered by the central management device CPC of the initiator node IKN—data for a new communications group such as e.g. a group identifier Group-ID, a group profile etc., but also a security key SEC which is generated by the key generator KG for the new communications group, and forwarded to the central management device CPC of the initiator node.

The central management device CPC of the initiator node IKN then forwards all necessary information such as, for example, the group identifier Group-ID, a group profile etc. to the message builder MB of the initiator node which then generates a broadcast message BC. Apart from the group identifier Group-ID and information Group-Info about the communications group such as, e.g. group profiles, purpose etc., this broadcast message also contains at least an identifier ID1 and an address ADR1 of the initiator node IKN. For example, the IP or MAC address of the initiator node IKN can be used as address ADR1.

The identifier ID1 of the initiator node can be generated, for example, with the aid of an asymmetric encryption system by encrypting the group identifier Group-ID with a private key of the initiator node IKN. In this context, e.g. a security service already present in a communications network or in collaborating communications networks can be used. If, for example, no security service is available, a public key must also be transmitted in the broadcast message BC for authenticating the initiator node IKN.

In a further method step 12, the broadcast message BC is then transmitted by the message transmitter MT—triggered by the message builder MB—to the transmission medium UT by means of which the broadcast message BC is provided to all nodes KN accessible via this transmission medium UT.

The incoming message analyzer IMA of the node KN shown by way of example in FIG. 2, which has been triggered by the central management device CPC of the node KN, analyzes the contents of all incoming messages such as, e.g. also those of the broadcast message BC after they have been received by the message receiver MR. The information of the broadcast message BC is then forwarded in the node KN from the incoming message analyzer IMA to the central management device CPC of the node KN where the authentication of the initiator node IKN is carried out—for example with the aid of a corresponding public key of the initiator node IKN if an asymmetric encryption system is used. In addition, the information Group-Info about the communications group such as, e.g. group profiles, purpose etc., sent along with the broadcast message BC, is analyzed and a decision is made whether the node KN is participating in the communications group or not. In this context, the user of the node KN can also be contacted and requested to input a decision, e.g. by means of a dialogue window on the display of a terminal.

If the node is not participating in the communications group, the broadcast message BC is simply discarded by the node KN. If, however, the node KN becomes a participant in the communications group, its group information management device GIM—triggered by its central management device CPC—stores the information on the communications group such as, e.g. the group identifier Group-ID, the group profile etc., and after that, its message builder MB is activated. The message builder than generates a first unicast message UC1 to the initiator node IKN which comprises at least an identifier ID2 and an address ADR2 of the node. As the address ADR2, for example, the IP or MAC address of the node IK can be used. The identifier ID2 of the node KN can be generated, for example, by encrypting the group identifier Group-ID with a private key of the node KN as in the case of the initiator node.

This first unicast message UC1 which can be encrypted, e.g. with the public key of the initiator node IKN for security reasons, is then sent to the initiator node IKN in a third method step 13 by means of message transmitter MT of the node KN and via the transmission medium UT.

The message receiver MR of the initiator node IKN receives the first unicast message UC1, decrypts it and forwards it to the incoming message analyzer IMA of the initiator node IKN for analysis. The incoming message analyzer IMA of the initiator node IKN then conveys the contents of the first unicast message UC1 to the central management device CPC of the initiator node IKN where the node KN is authenticated—for example with the aid of a corresponding public key of the node KN if an asymmetric encryption system is used. Corresponding to the procedures for communications groups, stored in the policy manager, the node KN is then accepted into the communications group as a new participating node and the information on the communications group stored by the group information management device GIM is updated.

After that, the message builder MB of the initiator node is activated and generates a second unicast message UC2 for transporting the necessary detailed information about the communications group. This second unicast message UC2 contains at least the multicast identifier MC-ID of the communications group and the security key SEC already generated by the key generator KG for a secure transmission of messages within the communications group.

This second unicast message UC2 which, for security reasons, can be encrypted, e.g. with the public key of the node KN, is then transmitted to the node KN in a fourth method step 14 by means of message transmitter MT of the initiator mode IKN and via the transmission medium UT.

The message receiver MR of the node KN then receives the second unicast message UC2, decrypts it and forwards it to the incoming message analyzer IMA of the node KN for analysis. The incoming message analyzer IMA then conveys the contents of the second unicast message UC2 to the central management device CPC of the node KN which then triggers the group information management device GIM of the node KN for updating the stored information on the communications group and storing, e.g. the multicast identifier MC-ID and the security key SEC of the communications group.

In a fifth method step 15, multicast and/or unicast messages can then be exchanged in secure form with the aid of the security key SEC by the node KN within the communications group.

The node KN shown in FIG. 2, by way of example, stands for each node of a communications network or several collaborating communications networks which can be accessed by the broadcast message BC. Each node KN is accepted into the communications group by means of unicast messages UC1 and UC2 which are exchanged between node KN and initiator node IKN, or in accordance with the two method steps 13 and 14, respectively.

For a synchronization of a starting time—as would be appropriate, for example, for the transmission of video information—the initiator node IKN can send a special encrypted multicast message to all nodes KN participating in the communications group. For some applications such as, for example, discussion forums, it may also be appropriate if, e.g. the identifiers, the addresses or information about all nodes KN participating in the communications group are distributed by means of multicast message by the initiator node IKN.

To continuously expand a communications group which already exists, a broadcast message BC can be sent out, for example in periodic intervals by the initiator node IKN. Generating and sending out this broadcast message BC which should contain at least the group identifier Group-ID, information Group-Info about the communications group such as, e.g. group profiles, purpose etc, the identifier ID1 and an address ADR1 of the initiator node IKN, occurs as described in the two method steps 11 and 12. If a node KN then participates in the communications group on the basis of this broadcast message BC, method steps 13 and 14 described in FIG. 2 are then also executed.

Figure 3:
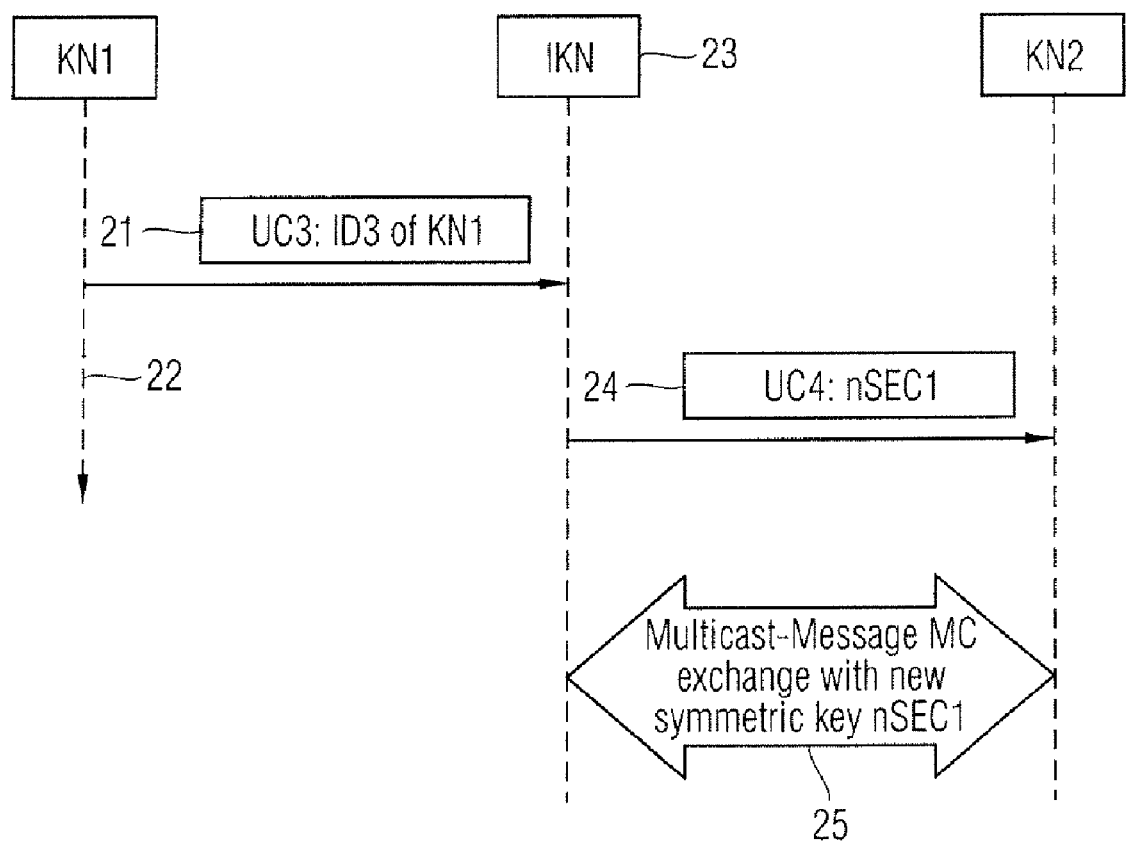
FIG. 3 shows the diagrammatic sequence of a participating node leaving the temporarily formed communications group.
Figure 4:
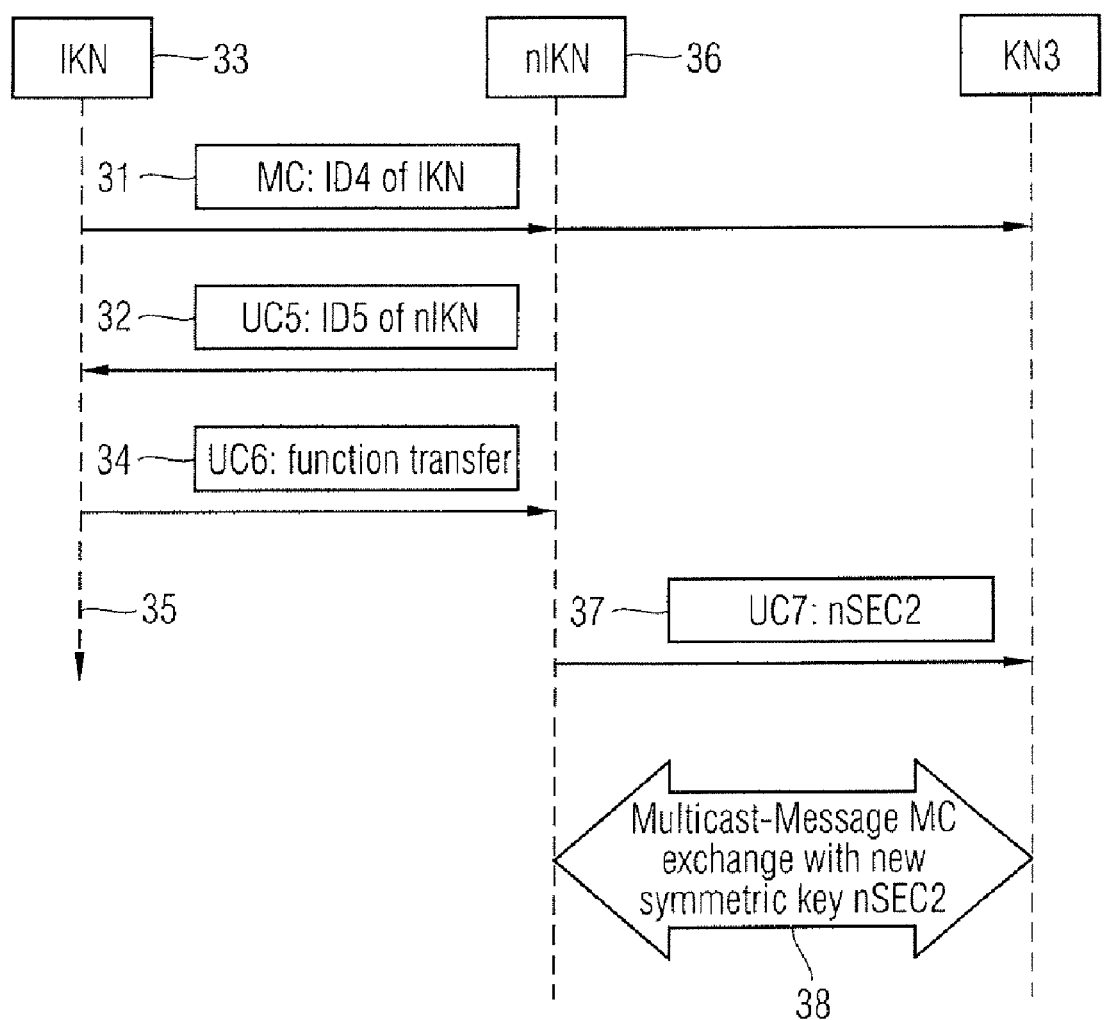
FIG. 4 shows the diagrammatic sequence of an initiator node leaving the temporarily formed communications group.

For the sake of simplicity, a detailed representation of the processes occurring within the nodes IKN, nIKN, KN1, KN2, KN3—detailed collaboration of the logic components of the nodes IKN, nIKN, KN1, KN2, KN3—is omitted in the further exemplary statements relating to the sequences shown in FIG. 3 and FIG. 4 since these scarcely differ from the processes already described.

For example, FIG. 3 describes the sequence when an exemplary node KN1 leaves an existing communications group. In a sixth method step 21, a node KN1 which leaves the communications group sends a third special unicast message UC3 to the initiator node IKN. In this context, this third unicast message UC3 comprises at least one identifier ID3 of the node KN1, wherein a private key of the node KN1 can be used for generating this identifier ID3, for example. In a seventh method step 22, the node KN1 then leaves the communications group.

After the initiator node IKN has received the third unicast message UC3, the node KN1 is authenticated in an eighth method step 23—for example with the aid of a corresponding public key—and all information belonging to this node KN1 is deleted. For this purpose, the central management device CPC of the initiator node IKN triggers the group information management device GIM into updating the stored information on the communications group, and generates a new security key nSEC1 for the communications group with the aid of the key generator KG.

In a ninth method step 24, the initiator node IKN then sends a fourth unicast message UC4 to each node KN2 still participating in the communications group. This fourth unicast message UC4 contains at least the new security key nSEC1 of the communications group. However, this fourth unicast message UC4 can also be used for sending information (e.g. identifier ID3, address etc.) of the node KN1 which has left the communications group. In addition, it is also possible for the group identifier and/or the multicast identifier to be changed, for example for security reasons, and for the nodes KN2 remaining in the communications group to be informed of the new identifiers with the fourth unicast message UC4. For security reasons, the respective fourth unicast message UC4 is encrypted, e.g. additionally with a public key of the respective node KN2 to which this fourth unicast message UC4 is sent.

In a tenth method step 25, multicast and/or unicast messages can again be exchanged in secure form—but with the new security key nSEC1—within the communications group by the nodes KN2 remaining in the communications group. If the group identifier and/or the multicast identifier of the communications group have also been changed, these new identifiers will be used from this point for exchanging multicast and/or unicast messages.

FIG. 4 describes by way of example the sequence when the initiator node IKN leaves the communications group.

In this context, the initiator node IKN sends in an eleventh method step 31 a special multicast message MC to all nodes nIKN, KN3 participating in the communications group, by means of which message the initiator node IKN requests a transfer of a function as initiator node IKN. This multicast message comprises at least one identifier ID4 of the initiator node IKN, wherein a private key of the initiator node IKN can be used for generating this identifier ID4, for example.

After having received this multicast message MC and the authentication of the initiator node IKN, a node nIKN can decide whether the function as initiator node is taken over. For this purpose, this node nIKN transmits in a twelfth method step 32 a fifth special unicast message UC5 which contains at least one identifier ID5 of the node nIKN, which has been generated, e.g., by using a private key of the node nIKN, to the initiator node. After that, this node nIKN waits for a response from the initiator node IKN. If the node nIKN is not contacted by the initiator node IKN within a predefined period of time, the process is simply discarded.

In a thirteenth method step 33, the initiator node IKN evaluates all received responses to the multicast message MC—i.e. responding nodes nIKN are authenticated and then a new initiator node is selected, wherein various procedures can be applied which can be requested, e.g. from the policy manager PM. For example, the function of the initiator node IKN can be transferred to the node nIKN from which a response was first received. However, the user of the initiator node IKN can also be contacted, e.g., through a dialog window on the display of a terminal and requested to input a decision.

If a decision has been made about transferring the initiator function, the information necessary for controlling the communications group (e.g. group identifier, group profile, identifiers of the participating nodes etc.) is transmitted in a fourteenth method step 34, to the node nIKN which is to take over the initiator function, with a sixth special unicast message UC6. This sixth unicast message UC6 can be encrypted, if necessary, e.g. for security reasons, with, for example, a public key of the node nIKN.

The initiator node deletes from its group information management device GIM all information belonging to the communications group handed over. In a fifteenth method step 35, the initiator node then leaves the communications group.

By receiving the sixth unicast message UC6, nodes nIKN take over the initiator function—i.e. this node nIKN, in a sixteenth method step 36, stores the received information about the communications group and the participating nodes KN3 with the aid of its group information management device GIM and generates by means of its key generator KG a new security key nSEC2 for the communications group.

In a seventeenth method step 37, the node nIKN, as new initiator node, generates and sends out a seventh unicast message UC7 for the node KN3 which has remained in the communications group. This seventh unicast message UC7 contains at least the new security key nSEC2 of the communications group. However, information (e.g. identifier ID4, address etc) of the initiator node IKN which has left the communications group can also be sent out with this seventh unicast message UC7. For security reasons, the respective seventh unicast message UC7 can be additionally encrypted with a public key of the respective node KN3, for example.

In addition, it is also possible for, for example for security reasons, the group identifier and/or the multicast identifier to be changed by the node nIKN as the new initiator node, and for the nodes KN3 remaining in the communications group to be informed of the new identifiers with the seventh unicast message UC7.

If, e.g., all participating nodes leave a communications group or only one node or the initiator node IKN, respectively, remain in the communications group, this communications group is automatically closed down. To ensure the existence of a communications group with secure transmission, the initiator node KN, for example, can periodically send out a special enquiry (e.g. in the form of a multicast message) to all participating nodes in order to inform them about the existence of an initiator node IKN. In addition, the initiator node IKN can demand a return message to this enquiry in order to, e.g. ensure the existence of the participating nodes.

Sending the broadcast, multicast and unicast messages BC, MC, UC can be effected, for example, by using Ethernet (IEEE802.3) and/or Wireless LAN (WLAN, IEEE802.11) technology.

These technologies (Ethernet, WLAN) provide for transmission of these messages on the so-called data link layer, e.g. protocol stacks implemented in accordance with the OSI (Open System Interconnection) model (layer 2, also-called data link layer or link layer), as a common transmission medium UT. In this context, these messages are also transported, e.g. via various network elements such as e.g. repeaters or bridges on the same layer 2 or the same link layer.

The transmission of the unicast messages UC and broadcast messages BC used by the method according to the invention, in particular, can be implemented in a simple and direct manner in these technologies (Ethernet, WLAN).

The transmission of the multicast messages MC used in the method according to the invention—such as, e.g. for the communication taking place within the communications group—can then always be effected in a simple manner, when Ethernet or WLAN technologies are used, whenever a so-called multicast address which corresponds to the multicast identifier MC-ID already quoted, has been distributed by an, e.g. encrypted unicast message to the individual nodes KN participating in a communications group by an initiator node IKN.

In principle, the basic structure of the broadcast, multicast and unicast messages BC, MC, UC when Ethernet or WLAN technology is used corresponds to the structure of a data packet according to Ethernet (IEEE802.3) or WLAN (IEEE802.11), respectively.

The invention claimed is:

1. A method for dynamically setting up and controlling temporarily formed communications groups with secure transmission, wherein nodes potentially participating in a communications group are connected via a common transmission medium that enables efficient transmission of broadcast and/or multicast messages between the nodes, the method which comprises the following steps:

sending a broadcast message from an initiator node to all nodes connected to the initiator node via the common transmission medium, the broadcast message containing at least one group identifier, an identifier of the initiator node, information about the communications group, and an address of the initiator node;

analyzing the received broadcast message by the nodes accessible via the common transmission medium, wherein the initiator node is authenticated by the nodes;

responding with a first unicast message by nodes participating in the communications group to the initiator node, the first unicast message containing at least one identifier of a participating node and an address of the participating node;

receiving first unicast messages by the initiator node and authenticating the participating nodes by the initiator node;

sending a second unicast message from an initiator node to each node participating in the communications group, the second unicast message including at least one multicast identifier and a security key;

if the initiator node leaves the communications group, the initiator node sends a special multicast message including at least an identifier thereof and a request for function transfer to all nodes participating in the communications group;

all nodes that take over an initiator function send a third special unicast message that contains at least their identifier to the initiator node;

after receiving this third unicast message and authenticating the responding nodes, the initiator node selects from the responding nodes a new initiator node in accordance with a predetermined procedure;

the initiator node then transmits information about the communications group and about the participating nodes by way of a fourth unicast message; and a new initiator node then takes over the initiator function and generates a new security key, and the new initiator node sends the new security key encrypted and together with information about the new initiator node to each node present in the communications group by way of a fifth unicast message.

2. The method according to claim 1, which comprises, for a synchronized start of the communications group, sending a special encrypted multicast message from the initiator node to all nodes participating in the communications group.

3. The method according to claim 1, which comprises sending the identifiers of all nodes participating in the communications group from the initiator node to each of the nodes participating in the communications group.

4. The method according to claim 1, wherein:

for continuously expanding an existing communications group, the initiator node sends a broadcast message at periodic intervals via the common transmission medium, the broadcast message containing at least one group identifier, an identifier of the initiator node, information about the communications group, and an address of the initiator node;

nodes desirous of joining the existing communications group send a first unicast message containing at least one identifier and an address of the participating node to the initiator node; and these nodes are then authenticated by the initiator node and a second unicast message comprising at least the multicast identifier and the security key of the communications group is sent to these nodes.

5. The method according to claim 1, wherein:

a node that is leaving the communications group sends a third sixth special unicast message, which includes at least the identifier of the respective node, to the initiator node;

the initiator node, upon receiving the sixth special unicast message, authenticates the respective node and deletes the information belonging to the respective node; and the initiator node then generates a new security key and sends the new security key in encrypted form to each node remaining in the communications group by way of a seventh unicast message.

6. The method according to claim 5, which comprises sending in the seventh unicast message information about the node that has left the communications group together with the new security key.

7. The method according to claim 5, which comprises, when the respective node leaves the communications group, changing the multicast identifier and/or the group identifier in addition to the security key.

8. The method according to claim 1, which comprises utilizing an asymmetric encryption system for setting up the communications group and/or for leaving the communications group.

9. The method according to claim 1, which comprises utilizing a symmetric encryption system within the communications group.

10. The method according to claim 1, which comprises utilizing a medium of the data link layer as the common transmission medium.

11. The method according to claim 1, which comprises utilizing a radio transmission channel as the common transmission medium.

12. The method according to claim 1, which comprises utilizing a data bus as the common transmission medium.

13. The method according to claim 1, which comprises sending the broadcast messages, the multicast messages, and the unicast messages by way of the Ethernet standard or the Wireless Local Area Network standard.

* * * * *